(No Model.)

A. SCHAD.
COMBINED SHOVEL AND HOE.

No. 368,013. Patented Aug. 9, 1887.

WITNESSES:
Fred G. Dieterich
Edw. W. Byrn

INVENTOR:
Anton Schad
BY Munn & Co
ATTORNEYS.

UNITED STATES PATENT OFFICE.

ANTON SCHAD, OF LOUISVILLE, KENTUCKY.

COMBINED SHOVEL AND HOE.

SPECIFICATION forming part of Letters Patent No. 368,013, dated August 9, 1887.

Application filed June 15, 1887. Serial No. 241,412. (No model.)

*To all whom it may concern:*

Be it known that I, ANTON SCHAD, of Louisville, in the county of Jefferson and State of Kentucky, have invented a new and useful Improvement in a Combined Shovel and Hoe, of which the following is a specification.

The object of my invention is to provide a simple and inexpensive implement which may at will be converted into either a shovel or a hoe; and to this end it consists in the peculiar construction and arrangement of a handle and blade and locking devices whereby the blade may be rigidly fixed in line with the handle or be set at an angle thereto, as hereinafter fully described.

Figure 1:
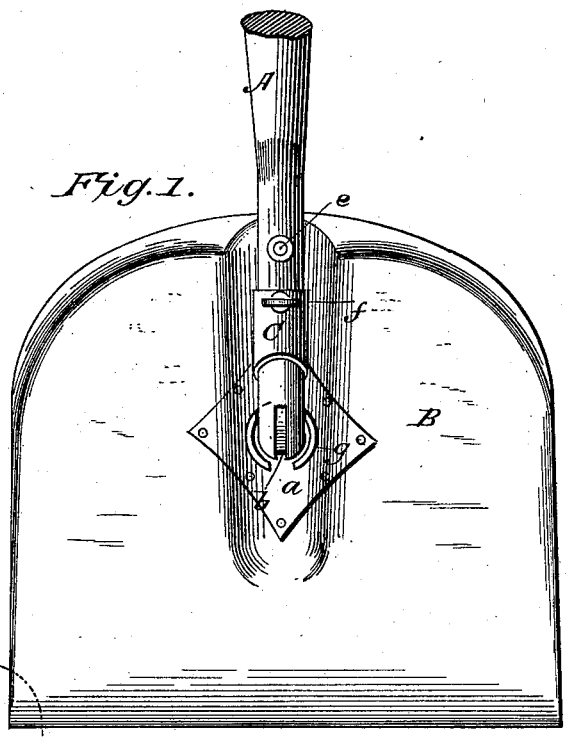
Figure 2:
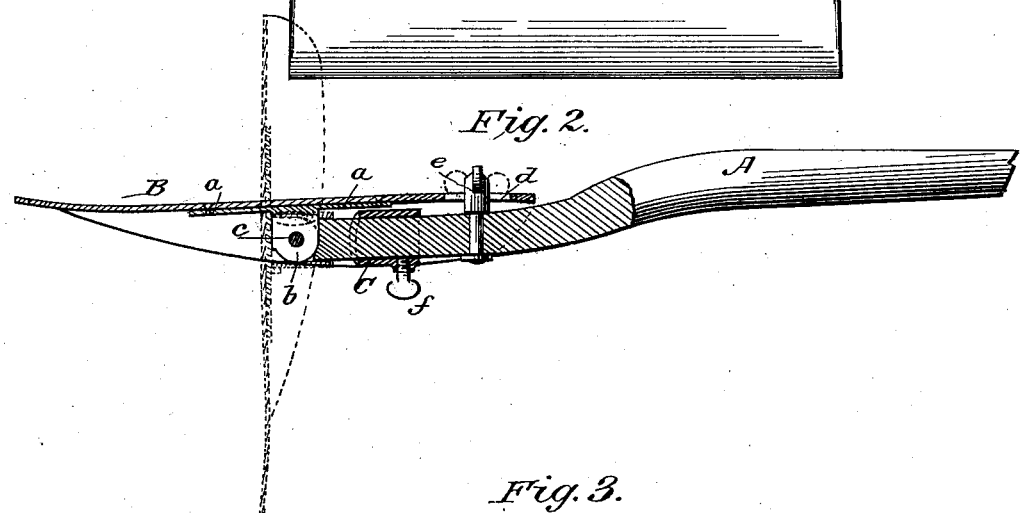
Figure 3:
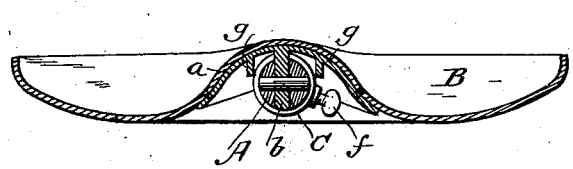

Figure 1 is a rear view; Fig. 2, a longitudinal section, and Fig. 3 a cross-section.

A represents an ordinary form of shovel-handle, except that it is made a little longer than usual.

B is the blade, which is formed of sheet metal, with a middle ridge forming a deep groove in the rear side, in which lies the lower end of the handle. To the middle of the blade, on its rear side, is riveted (or cast upon the same) a re-enforce plate, $a$, having a right-angular lug, $b$, to which is jointed by a hinge-bolt, $c$, the lower end of the handle. At the upper part of the ridge of the blade is formed a key-hole slot, $d$, and at a corresponding position on the handle is pivoted a turn-key, $e$, having an elongated head. When the head of this turn-key is disposed longitudinally with the handle, it registers with and passes through the slot $d$, and the head of the key may then be turned crosswise the slot, so as to rest upon the front face of the blade and lock the latter in its longitudinal position for use as a shovel.

When the implement is to be used as a hoe, the blade is turned on its pivotal connection to a position approximating a right angle, as indicated by dotted lines. In this position the blade is held by a sliding collar, C, arranged upon the lower end of the handle between the turn-key and the hinge, and provided with a set-screw, $f$, for fixing it in its position rigidly to the handle. When the implement is to be converted into a hoe, the blade is first turned, as indicated in dotted lines, and the collar C is then slipped down until its lower end embraces the lug $b$ and also finds a bearing against an abutting seat, $g$, on the re-enforce plate of the blade, and the collar being locked in this position by its set-screw the blade will be rigidly held in position for use as a hoe.

The lower part of the handle is made of iron, or may be re-enforced by iron straps or a sleeve. If desired, the hinge may have a guard flange or hood below it to partially house and protect it from dirt when the implement is used as a shovel. If desired, the blade may also be constructed as a spade to act in the same way. I may also make the handle longer, so that the implement may be used as a scraper, and this increased length may be obtained by an extensible section of handle of any approved construction.

I am aware that it is not broadly new to hinge the blade of a shovel to the handle and to provide locking devices for holding them in line or at an angle to form two different implements. My invention is, however, distinctive in these features, that the handle is hinged to the blade at or near the middle of the blade and lies in a groove formed by the middle ridge, as in Fig. 3. This not only protects the handle and its connections from abrasion with the earth, but it allows the blade to be connected to the handle above the hinge by the key and slot, which makes a very stiff and strong connection. My invention is also distinctive in the abutment-collar C, whose end next to the blade is shaped to fit a bearing on the blade and lock the blade at an angle, as shown in dotted lines.

Having thus described my invention, what I claim as new is—

1. The combined implement herein described, consisting of a blade having a middle ridge forming a groove on the back, the handle hinged to the middle of the blade in said groove, and locking devices at the upper end of the blade for connecting it to the handle, as described.

2. The combination of the handle and the blade formed with a slot at its upper end and with a middle ridge, the two being hinged together about the middle of the blade, and the turn-key attached to the handle and adapted to co-operate with the slot in the blade to lock the top of the same, as described.

3. The combination, with the blade and the handle hinged to the blade above its middle, of a sliding abutment-collar on said handle, having its lower end adapted to abut against the blade and hold it in rigid angular position, and a set-screw for locking the abutment-collar to the handle, substantially as described.

ANTON SCHAD.

Witnesses:
   ADOLPH FISCHER,
   A. J. BRANDEIS.